Dec. 16, 1958     E. E. MODES     2,864,535
FLUID METERING DEVICE
Filed Oct. 27, 1955     2 Sheets-Sheet 1

INVENTOR
EDWARD E. MODES
BY ATTORNEYS

Dec. 16, 1958   E. E. MODES   2,864,535
FLUID METERING DEVICE
Filed Oct. 27, 1955   2 Sheets-Sheet 2

INVENTOR
EDWARD E. MODES
BY
ATTORNEYS

United States Patent Office 2,864,535
Patented Dec. 16, 1958

2,864,535

FLUID METERING DEVICE

Edward E. Modes, Chicago, Ill., assignor to The Dole Valve Company, Chicago, Ill., a corporation of Illinois Application October 27, 1955, Serial No. 543,224

2 Claims. (Cl. 222—54)

This invention relates to improvements in fluid metering devices and more particularly relates to such devices adapted to meter a constant volume of fluid to an ice tray for freezing.

A principal object of the invention is to provide a simplified and improved metering device, particularly adapted for use with automatic ice makers and operated in a simpler manner than the metering devices heretofore in use.

A further object of the invention is to provide a novel and improved metering device for supplying a measured volume of water or other fluid to be frozen to an ice tray for freezing, in which the device is operated by a simplified form of heat motor.

A still further object of the invention is to provide a novel and simplified form of metering device to be contained within a household refrigerator for sequentially filling an ice cube tray with a metered volume of fluid, together with a cyclically operated operating mechanism therefor in the form of heat motor.

A still further object of the invention is to provide a novel and simplified form of apparatus to be contained within a household refrigerator for metering measured volumes of fluid and supplying the same to the ice tray of an automatic ice maker, in which a compact form of heat motor serves both to operate the ejecting mechanism for ejecting ice cubes from the tray and to sequentially operate the metering device to supply a measured volume of fluid to the tray at the termination of an ejecting operation.

These and other objects of the invention will appear from time to time as the following specification proceeds and with reference to the accompanying drawings wherein:

Figure 3 is a fragmentary plan view of the device showing the device operatively associated with an ice cube tray for supplying the same with fluid.

Figure 1:
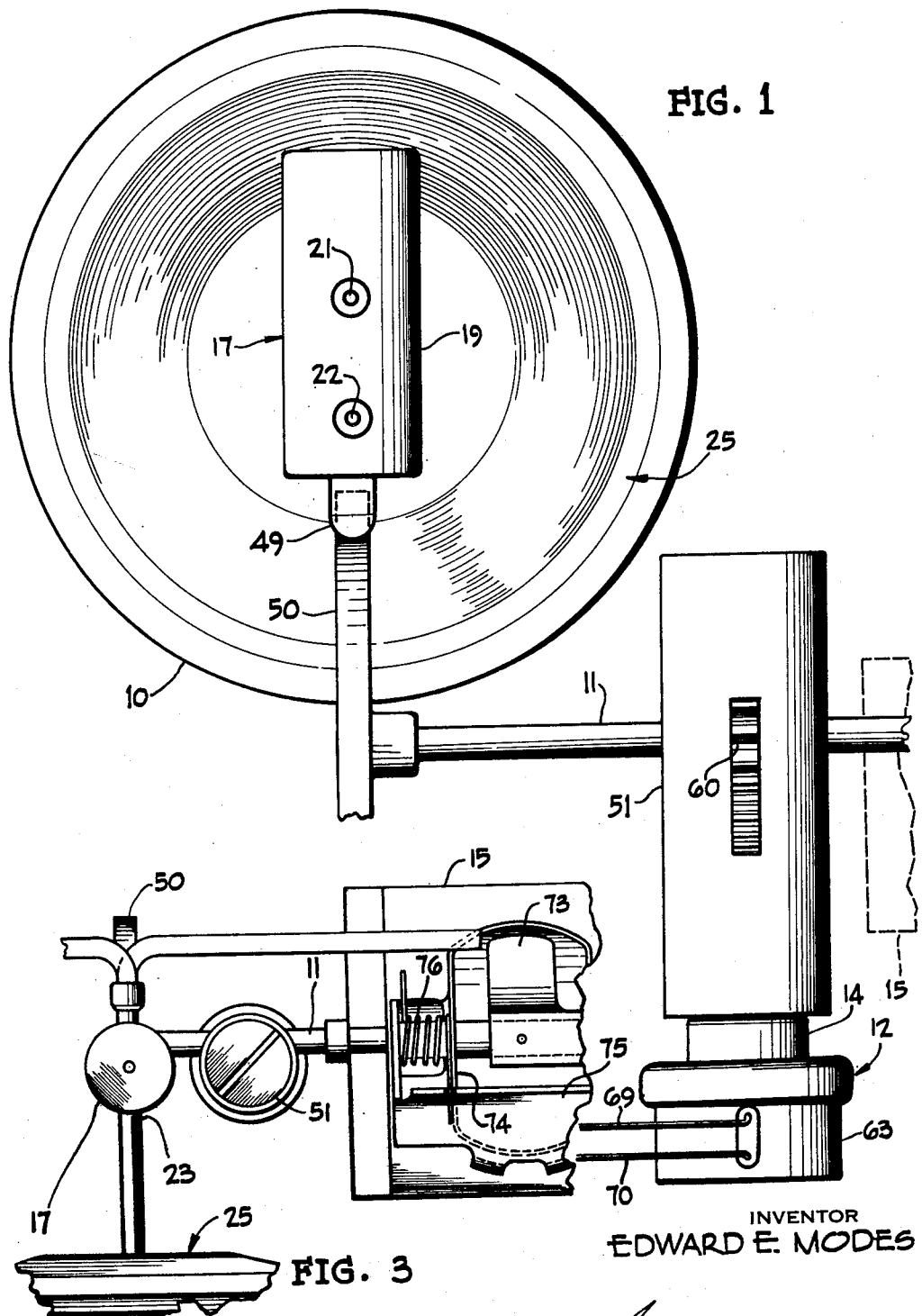
Figure 1 is a diagrammatic view in side elevation of a metering device constructed in accordance with my invention.

In the embodiment of the invention illustrated in the drawings, I have shown in Figure 1 a metering device 10 sequentially operated by a shaft 11 operated by a heat motor 12. The heat motor 12 has a rectilinearly movable piston 13 extensible with respect to a cylinder 14, upon predetermined increases in temperature, to rotatably drive the shaft 11 to effect the measuring and supply of a measured volume of fluid to an ice tray 15 and the ejection of the frozen ice cubes from said tray as will hereinafter more clearly appear as this specification proceeds.

The metering device 10 also includes a valve 17 having a valve body or block 19 having a chamber 20 therein. An inlet 21 for fluid, such as, water at household pressure enters said block and chamber. An outlet 22 for metered fluid or water leaves said chamber adjacent the lower end portion thereof.

A passageway 23 leads from the chamber 20 intermediate the inlet 21 and outlet 22. The passageway 23 has communication with a measuring or metering chamber 25, herein shown as being in the form of an accumulator. The metering chamber 25 includes a rear housing 26 having a rearwardly extending central cylindrical portion 27 the end of which forms a seat for a spring 29. The spring 29 is seated at one end in an annular recess 30 formed in the end of the cylindrical portion 27 and is seated at its opposite end along a boss 31 of a diaphragm plate 32. The diaphragm plate 32 is maintained in abutting engagement with a diaphragm 33 by the spring 29. The opposite side of the diaphragm 33 from the spring 29 is closed by a front housing 35. The front housing 35 has an annular recess 36 adjacent its outer margin within which extends a flange 37 of the diaphragm 33. The margin of the front housing 35 extends along the outer edge of the flange 37 and rear housing 26 and is spun or crimped over said rear housing, sealing said diaphragm to said housings 26 and 35, to form a fluid-tight chamber in the space between the front face of the diaphragm 33 and the inner face of the front housing 35.

The end of the cylindrical portion 27 of the rear housing 26 is apertured as indicated by reference character 39 to subject the rear portion of the diaphragm 33 to atmospheric pressure.

Upon the admission of fluid under pressure from the inlet 21 to the valve chamber 20 and through the passageway 23 to the diaphragm chamber 25, the diaphragm 33 may be extended to the inner wall of the rear housing, against the bias of the compression spring 29 and may be held in this extended position as long as there is pressure on the front face of said diaphragm from the inlet 21.

The valve 17 includes a valve spool 40 movable along the valve chamber 20 and having an upper piston 41 for controlling the flow of fluid from the inlet 21 to the passageway 23 and a connected lower piston 43 controlling the flow of fluid from the passageway 23 through the outlet 22. The pistons 41 and 43 have O-rings 44 and 45, respectively, recessed therein for sealing the ends of the chamber 20 and are also sealed on the inner sides of the inlet 21 and the outlet 22 by O-rings 46 recessed within the wall of the valve chamber 20. A spring 47 seated in one end of the chamber 20 abuts the inner end of the piston 41 and biases the valve spool 40 in a direction to engage an outer follower end portion 49 thereof with the face of a cam 50 keyed or otherwise secured to the shaft 11 and rotatably driven thereby.

The shaft 11 is rotatably journaled in a housing 51 for a rack 53 operated by the piston 13 of the heat motor 12. The housing 51 is threaded on the cylinder 14 and has an upper chamber 55 forming a guide for a disk 56 secured to the upper end of the rack 53. The disk 56 is abutted by a spring 57 interposed between said disk and an end plug 59 for the housing 51. The spring 57 serves to retractibly move the rack 53 and also serves as a return spring for the piston 13 of the heat motor 12. The rack 53 meshes with a pinion 60 keyed or otherwise secured to the shaft 11 for rotatably driving said shaft.

The thermal element or heat motor 12 is of the so called power or a high motion solid filled type of thermal element, such as is shown and described in the Vernet Patent No. 2,386,181, dated January 30, 1945. This thermal element has been selected for its compactness and simplicity, as well as its extreme power and the relatively long range of travel of its power member or piston 13. In such types of thermal elements, a thermal medium (not shown) in the form of a fusible material is contained within a casing 67 for the thermal element and reacts against a membrane or deformable member (not shown), to extend the power member or piston 13 which respect to the cylinder 14 and casing 67, as the thermal medium reaches its fusion point. The thermal medium may be a wax alone or a wax containing a powdered metal heat conductor and a binder, the material used being selected for its melting or fusion point, and the fusion point thereof determining the temperature range of operation of the thermal element.

Figure 2:
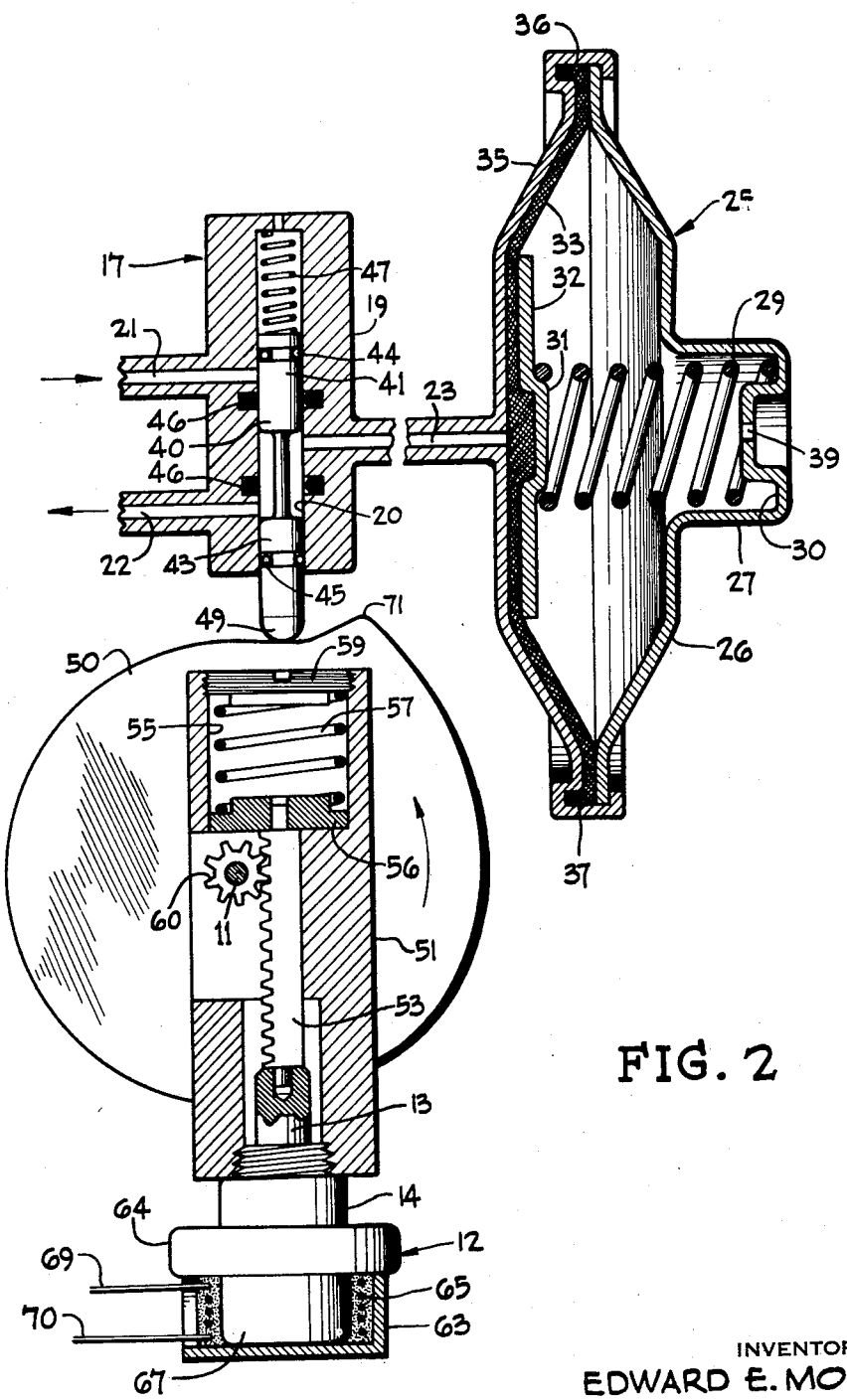
Figure 2 is a transverse sectional view taken through the device.

The casing 67 is shown as being contained within an outer casing 63 spaced outwardly therefrom and abutting the under surface of a heat conductor ring 64 of the thermal element. A resistance heater 65 encircles the casing 67 within the outer casing 63 to heat the casing 67 and the thermal medium contained therein to its fusion point, and effect extensible movement of the piston 13 from the cylinder 14. Conductors 69 and 70, connected with a suitable source of power through a timer or sequence switch not shown are provided to energize the heater 65 in the desired timed sequence to effect extension of the piston 13 from the cylinder 14 and effect rectilinear movement of the rack 53 and effect rotation of the pinion 60 and cam 50 in a direction which in Figure 2 is shown as being a counterclockwise direction.

The cam 50 is shown as having a peak 71 engaging the follower end portion 49 of the spool valve 40 for moving the spool valve into position to block the flow of fluid through the outlet 22 by the valve piston 43 and to admit water under household pressure from the inlet 21 through the passageway 23 to the diaphragm chamber 25, to move the diaphragm 33 against the compression spring 29 and fill said chamber and hold said diaphragm against the inner wall of the rear housing 26. The diaphragm may be held in the retracted position until the cam 50 has returned to the position shown in Figure 2. This is effected by deenergization of the resistance heater 65 with a resultant reduction in temperature of the thermal element, the compression spring 57 then returning the piston 13 within the cylinder 14 in accordance with the reduction in temperature of the thermal element.

The shaft 11 is shown in Figure 3 as extending along the top of the ice tray 15 and as being pivotally mounted on said tray, as in my joint application with Nicholas Miller, Serial No. 522,526, filed July 18, 1955, and entitled "Rotary Ice Cube Ejector Mechanism." The shaft 11 has a plurality of spaced pusher blades 73 secured thereto, each blade being associated with an ice cube cavity 74 to move toward said cavity into engagement with an ice cube (not shown), to pivot the cube out of said cavity upon operation of the shaft 11. The shaft 11 also has an ejector 75 freely mounted thereon and extending the length of the mold or tray 15. The ejector 75 is engaged by an ice cube as the pushers or scrapers 73 pivot the cubes from the tray, and is moved by the cubes against the torsion spring 76 as the ice cubes are removed from the tray. The torsion spring 76 then ejects the cubes beyond the edge of the tray into a suitable container, as in my joint application with Nicholas Miller and no part of my present invention so not herein shown or described further.

In operation of the device when the water in the ice tray 15 is frozen, a thermal element (not shown), sensing the temperature of the ice in the ice tray may effect the closing of an electric switch energizing the resistance heater 65. This will cause an increase in the temperature of the fusible thermally expansible material within the casing 67 and effect extension of the piston 13 from the cylinder 14. The piston 13 extensibly moving the rack 53 along the housing 51 against the spring 57 will transfer the rectilinear movement of the thermal element to rotational movement and rotate the pinion 60 and the cam 50 to cause the follower surface 49 of the valve piston 40 to ride upwardly along the cam 50 to the peak 71 thereof. This will move the piston 41 upwardly along the chamber 20 to accommodate the flow of fluid at a household pressure from the inlet 21 through the passageway 23 into the diaphragm chamber or accumulator 25. The piston 43 will now block the flow of water out the outlet 22. The continued flow of water through the passageway 23 will fill the diaphragm chamber against the action of the spring 29 moving the diaphragm into engagement with the inner face of the rear housing 26 and completely filling the diaphragm chamber.

At the same time, the shaft 11 is pivotally moving the pushers 73 into engagement with the ice cubes in the cavities 74 and pivoting said ice cubes out of said cavities into position for ejection by the ejectors 75, as in my aforementioned joint application with Nicholas Miller. During this movement of the pushers effected by continued extension of the piston 13 from the cylinder 14, the follower portion 49 of the valve piston 40 will remain on the high part of the cam 50, holding the valve piston 43 into position to close the outlet 22 and accommodate fluid under pressure entering the diaphragm chamber to hold the diaphragm against the inner wall of the rear housing 26.

The high part of the cam 50 is long enough to maintain the outlet 22 closed during the full extent of pivotal movement of the pushers to eject ice cubes from the tray 15 to prevent filling of the ice cube tray until the cubes have been completely ejected therefrom.

As the pushers 73 are pivoted to the full extent of pivotal movement thereof, a switch may be actuated either by rotatable movement of the shaft 11 or by operation of the pushers 73 or by a sequential control to deenergize the resistance heater 65. The spring 57 will then retractibly move the piston 13 within the cylinder 14 and effect rotation of the cam in a clockwise direction to the position shown in Figure 2. At this time the inlet 21 will be closed and the spring 29 will force the diaphragm 33 to meter the fluid within the diaphragm chamber 25 through the outlet 22 to fill the ice cube tray.

The valve spool 40 will then stay in this position until the beginning of a next ejecting operation, at which time the heat motor will again be heated to fill the diaphragm chamber 25 and at the same time eject ice blocks from the mold or tray 15.

It will be understood that various modifications and variations of the present invention may be effected without departing from the spirit and scope of the novel concepts thereof.

I claim as my invention:

1. In a fluid metering device for ice trays and the like, a metering chamber having a movable wall expanding said chamber upon the admission of fluid under pressure thereto and contracting said chamber upon the release of fluid under pressure therefrom, spring means for contractibly moving said wall, a valve block having a valve chamber having communication with said metering chamber and having a valve spool movable therealong, an inlet into said valve chamber adjacent one end thereof, an outlet from said valve chamber adjacent an opposite end thereof, a rotatable cam engageable with said valve spool for operating the same, a spring maintaining said valve spool in engagement with said cam, motor means for rotatably moving said cam comprising a solid fill thermal element having a cylinder and an extensible piston extensible therefrom upon predetermined increases in temperature, a resistance heater associated with said thermal element and sequentially energizable to heat the same and effect extensible movement of said piston, a housing mounted on said cylinder and extending axially thereof, a shaft rotatably mounted in said housing and having said cam mounted thereon and means translating the rectilinear movement of said piston into rotational movement for rotating said cam comprising a rack operated by said piston and a pinion on said shaft meshing with said rack and operating said shaft and cam.

2. In a fluid metering device for ice trays and the like, a metering chamber having a movable wall expanding said chamber upon the admission of fluid under pressure thereto and contracting said chamber upon the release of fluid under pressure therefrom, spring means for contractibly moving said wall, a valve block having a valve chamber having communication with said metering chamber and having a valve spool movable therealong, an inlet into said valve chamber adjacent one end thereof, an outlet from said valve chamber adjacent the opposite end thereof, a rotatable cam engageable with said valve spool for operating the same, a spring maintaining said valve spool in engagement with said cam, a heat motor for operating said cam and valve comprising a solid fill thermal element having a casing containing a fusible thermally expansible material, a cylinder extending from said casing and a piston extensibly movable with respect to said cylinder upon fusion of the thermally expansible material contained within said casing, a resistance heater in association with said thermal element and sequentially energizable to heat the same and effect extensible movement of said piston, a housing threaded on said cylinder and extending vertically from said cylinder, a shaft rotatably mounted in said housing and having said cam mounted thereon, a rack in axial alignment with said piston and rectilinearly guided in said housing, an end plug for said housing, a spring seated on said end plug and operatively connected with said rack for retractibly moving said piston upon predetermined reductions in temperature, and a pinion secured to said shaft and meshing with said rack and translating the rectilinear movement of said rack to rotary movement and pivotally moving said shaft and cam.

References Cited in the file of this patent

UNITED STATES PATENTS

| | | |
|---|---|---|
| 16,284 | Mason | Dec. 23, 1856 |
| 2,120,412 | Kucki | June 14, 1938 |
| 2,121,892 | Stiner | June 28, 1938 |
| 2,176,008 | Hoyt | Oct. 10, 1939 |
| 2,489,896 | Kempton | Nov. 29, 1949 |
| 2,512,212 | Molotzak | June 20, 1950 |
| 2,570,451 | Hottenroth | Oct. 9, 1951 |
| 2,606,427 | Kirkpatrick | Aug. 12, 1952 |
| 2,717,495 | Andersson | Sept. 13, 1955 |
| 2,717,500 | Ploeger | Sept. 13, 1955 |
| 2,717,502 | Barton | Sept. 13, 1955 |
| 2,770,102 | Roedter | Nov. 13, 1956 |